Dec. 15, 1931.  A. ROSEWOOD  1,836,133
VALVE WITH DETACHABLE SPOUT
Filed Sept. 19, 1928    2 Sheets-Sheet 1
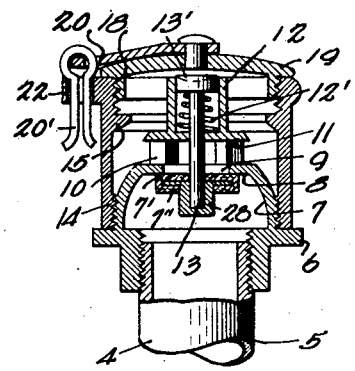
Fig. 1.
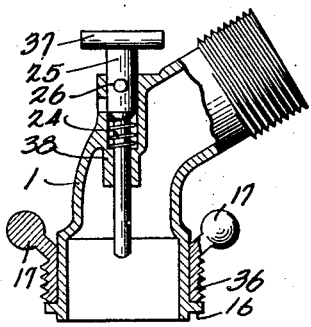
Fig. 2.
Fig. 4.
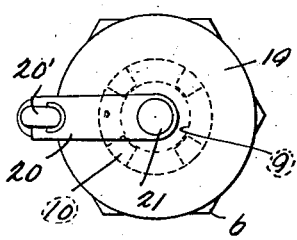
Fig. 3.
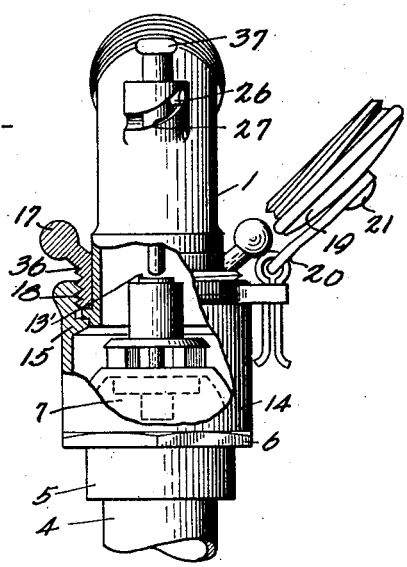
INVENTOR.
ALFRED ROSEWOOD
BY
Munn & Co
ATTORNEYS.

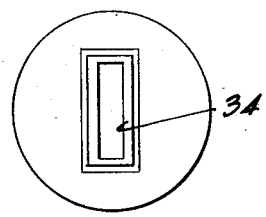
Fig-8-
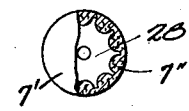
Fig-5-
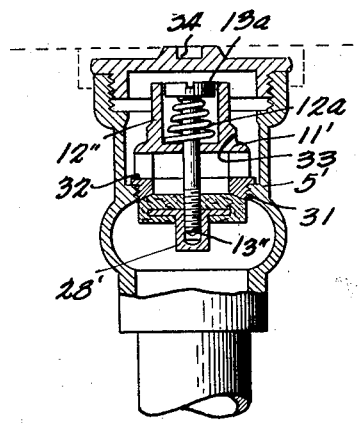
Fig-6-
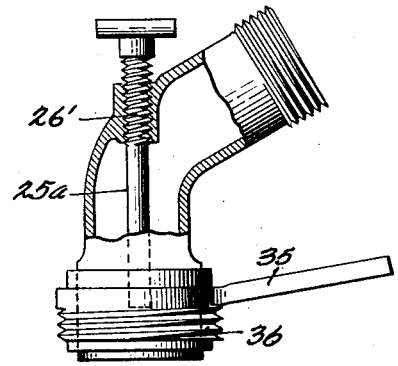
Fig-7-
INVENTOR.
ALFRED ROSEWOOD.
BY
Munn & Co
ATTORNEYS.

Patented Dec. 15, 1931

1,836,133

UNITED STATES PATENT OFFICE

ALFRED ROSEWOOD, OF SAN FRANCISCO, CALIFORNIA

VALVE WITH DETACHABLE SPOUT

Application filed September 19, 1928. Serial No. 306,932.

The invention relates to improvements in valves which are used on lawns and parks and concrete walks, or wherever it is desirable that the valve be substantially flush with the surrounding surface. The usual construction is an iron box having an outlet for connecting the hose and a square-headed screw holding a washer and a separate socket key for turning the water on and off.

The above construction is not satisfactory because the worker is apt to destroy the washer by turning the washer stem too severely, and the square head of the washer stem is often rendered useless by the use of pliers or pipe wrenches which tend to round off the corners.

The object of my improvement is to overcome the above mentioned difficulties; to provide a valve of a relatively small circular form in which the valve seats automatically upon release of the valve opening means, and finally to dispense with separate socket keys and pipe wrenches, and to provide a valve that may be operated only by means of a key which is a part member of the valve spout, and portable with the hose, and connected thereto.

Further objects and advantages of my invention will appear as the specification proceeds.

The preferred forms of my invention are illustrated in the accompanying drawings, in which:

Figure 1 shows a vertical section through the valve with a cap fastened thereto, Figure 2 a vertical section through a spout, having means for operating the valve incorporated therein, Figure 3 a plan view of the valve, Figure 4 a side elevation of the combined valve and spout with part of the casing broken away to show the interior, Figure 5 a plan view of a valve washer, a part being shown in section, Figure 6 a vertical section through a modified form of valve, Figure 7 a vertical section through a modified form of spout, and Figure 8 a plan view of the valve shown in Figure 6.

While I have shown only the preferred form of the invention, I wish to have it understood that various changes or modifications may be made within the scope of the claims hereto attached without departing from the spirit of the invention.

Similar numerals refer to similar parts throughout the several views. I prefer to construct my invention in the following manner. In the form shown in Figures 1 to 5, a fitting 5 is threaded on the pipe 4 and is provided with a hexagonal base 6 from which a dome-shaped member 7 rises with a flattened top perforated as at 9, which constitutes the valve seat 8. Two or more lugs 10 rise from the top of the dome and support a disc 11 which has a cylindrical housing 12 mounted thereon. A valve stem 13 is guided by the disc and has the valve 28 threaded thereon below the valve seat. A spring 12' encircling the valve stem bears against the disc 11 and the head 13' of the valve stem for normally seating the valve. The latter is shown in detail in Figure 5, and comprises a lug threaded on the stem having a star-shaped disc extending therefrom which is covered on both sides with a layer of vulcanized rubber as shown at 7' and 7''.

A cylindrical sleeve 14 is threaded to the base of the dome and is formed, somewhat above the disc 11, with an internal shoulder 15 and is threaded above the shoulder, as shown at 18, to receive the cap 19. The center of the latter is pivoted by means of a rivet 21 to a link 20, which latter is hinged to the head of a cotter pin 20' which is slidably received in a lug 22 extending from the sleeve 14.

The latter is also adapted to receive, upon removal of the cap, the spout 1 which may be of any suitable form and is preferably made in the shape of a goose neck. The spout may be let into the upper end of the sleeve 14 and has, near its lower end, a shoulder 16 adapted to seat on the shoulder 15 of the sleeve, while a threaded ring 36 formed with handles 17 is engaged with the thread 18 in the sleeve for forcing the shoulder 16 upon the shoulder 15. The spout is formed with a bearing 38 in axial alinement with the valve and has an operating pin 25 slidable in the bearing which is normally urged outward by a spring 24. A pin 26 extending from the pin rides in an inclined slot 27 in the spout wall so that the pin may be advanced for bearing on the valve head and for opening the valve by a turning movement. The pin is operated by means of a knob 37 at the outer end thereof.

The device thus far described is intended principally to be used on lawns, where the fitting 5 may be readily unscrewed from the pipe for giving access to the valve in case the latter has to be renewed. When my invention is to be used in connection with cement floors or the like, where the valve housing is embedded in the cement and may not be removed, I prefer to use the form illustrated in Figures 6 to 8, which gives access to the valve through the top of the housing 5' made of one piece and provided with an internal shoulder 31 adapted to threadedly receive a cage 11' having a shoulder 32 limiting its downward movement and forming a valve seat at its bottom for the valve 28' which is constructed similarly to that shown in Figure 5. The cage has the cylindrical housing 12" rising therefrom and serves as a guide for the valve stem 13" while the valve head 13ª is adapted to reciprocate in the housing 12" and is normally urged outward by the spring 12ª. The lower end of the housing 12" is made hexagonal as shown at 33 so that it may be turned by means of a socket wrench. The cap in this form is made freely removable and is provided with a groove 34 into which a suitable wrench may be inserted for turning the cap. For this purpose a person might use, for instance, the extreme end 35 of the special wrench shown in Figure 7, which is used for threading the ring 36 into the valve housing.

The spout shown in Figure 7 differs from that of Figure 2 principally by the fact that the operating pin 25ª for the valve is threaded into the spout housing as shown at 26' for imparting endwise movement to the same by a turning motion.

The operation of my valve will be readily understood from the foregoing description. The lawn valve shown in Figures 1 to 5 is normally covered by the cap 19 and does not appear above the surface of the lawn so that the latter may be mowed without interference on the part of the valve. The spout as a rule will remain attached to the hose, and an operator carries the hose with the spout from valve to valve, removing the cap and screwing on the collar 36. The cap cannot be lost due to its hinged connection with the valve housing. After the connection has been made between the valve and the spout, the operator manipulates the pin 25 by turning the same, which causes the small pin 26 to ride in the slot 27 and to advance the main pin for opening the valve. It will be seen that a single spout in this manner may serve a large plurality of valves. As soon as the spout is removed or the pin 25 reversed, the valve is automatically closed by the spring 12' and also by the pressure within the water system. It will thus be seen that at no time can the operator exert undue pressure for bringing the valve washer to its seat, which in many cases is the cause for valve washers wearing out quickly. It will further be noted that the valve as shown in Figure 1 may easily be removed from the pipe 4 for giving access to the washer in case a renewal should be required.

The device shown in Figures 6 to 8 differs because it is intended for a different purpose. It is supposed to be embedded in concrete, which makes it desirable that the valve washer be accessible through the top of the valve, and in this form I therefore fix the cage forming the valve seat in such a manner that the entire cage may be removed through the open top of the valve. I also show in Figure 7 an ordinary thread for advancing the pin 25ª.

I claim:

1. In combination, a valve housing comprising a dome-shaped fitting adapted to be threaded on a water pipe and having an opening in the top for forming a valve seat, a valve adapted to seat thereagainst from the inside having a stem extending through the opening, a baffle plate supported above the fitting in spaced relation thereto, a cylinder rising from the baffle plate, a head on the valve stem slidable in said cylinder, spring means active on the head and tending to seat the valve, a sleeve surrounding the fitting and a spout adapted to be threaded on the sleeve having means therein for operating the valve.

2. In combination, a valve housing comprising a fitting adapted to be threaded on a water pipe and having an opening for forming a valve seat, a valve adapted to seat thereagainst from the inside having a stem extending through the opening, means for guiding the stem having a baffle associated therewith for deflecting the water laterally when leaving the valve opening, and a spout adapted to be threaded to the sleeve and having means therein for opening the valve.

In testimony whereof, I have hereunto set my hand at San Francisco, California, this 15th day of September, 1928.

ALFRED ROSEWOOD.